United States Patent
Wu et al.

(10) Patent No.: US 8,199,120 B2
(45) Date of Patent: Jun. 12, 2012

(54) REPAIRABLE TOUCH CONTROL DEVICE AND METHOD OF REPAIRING TOUCH CONTROL PANEL

(75) Inventors: Yuan-Chun Wu, Hsin-Chu (TW); Hsin-Hung Lee, Hsin-Chu (TW); Mei-Sheng Ma, Hsin-Chu (TW); Kuo-Hsing Cheng, Hsin-Chu (TW); Yao-Jen Hsieh, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 749 days.

(21) Appl. No.: 12/340,769

(22) Filed: Dec. 22, 2008

(65) Prior Publication Data

US 2010/0007615 A1    Jan. 14, 2010

(30) Foreign Application Priority Data

Jul. 11, 2008    (TW) ................................ 97126362 A

(51) Int. Cl.
   *G06F 3/041*    (2006.01)
(52) U.S. Cl. ........................................................ 345/173
(58) Field of Classification Search .................. None
   See application file for complete search history.

(56) References Cited

U.S. PATENT DOCUMENTS

| 5,867,151 A | 2/1999 | Nakai |
| 6,111,621 A | 8/2000 | Kim et al. |
| 7,187,423 B2 * | 3/2007 | Ozaki et al. ................ 349/54 |
| 7,372,514 B2 * | 5/2008 | Matsumoto et al. ........... 349/55 |
| 7,737,940 B2 | 6/2010 | Wu |
| 2005/0068283 A1 * | 3/2005 | Tseng .......................... 345/93 |
| 2005/0184969 A1 * | 8/2005 | Dunn et al. ................. 345/173 |
| 2006/0007165 A1 * | 1/2006 | Yang et al. .................. 345/173 |
| 2007/0158655 A1 | 7/2007 | Lin |
| 2007/0159571 A1 | 7/2007 | Yang |
| 2007/0240914 A1 | 10/2007 | Lai |
| 2008/0158127 A1 * | 7/2008 | Chang et al. .................. 345/93 |
| 2009/0167976 A1 | 7/2009 | Chung |

FOREIGN PATENT DOCUMENTS

| CN | 101216643 A |   | 7/2008 |
| JP | 2001356340 A | * | 12/2001 |
| JP | 2005-249993 |   | 9/2005 |
| TW | 245252 |   | 12/2005 |
| TW | 247184 |   | 1/2006 |
| TW | 278690 |   | 4/2007 |
| TW | 200739402 |   | 10/2007 |
| TW | 200813919 |   | 3/2008 |
| TW | M334944 |   | 6/2008 |

* cited by examiner

*Primary Examiner* — Peter Vincent Agustin
(74) *Attorney, Agent, or Firm* — Winston Hsu; Scott Margo

(57) ABSTRACT

A repairable touch control device includes a substrate, a sensor circuit, and at least a repairing wiring. The substrate includes a sensor region, and a peripheral region. The sensor circuit, which includes sensor wirings, is disposed in the sensor region. The repairing wiring is disposed in the peripheral region for repairing the sensor wirings.

19 Claims, 12 Drawing Sheets

REPAIRABLE TOUCH CONTROL DEVICE AND METHOD OF REPAIRING TOUCH CONTROL PANEL

BACKGROUND OF THE INVENTION

1. Field of the Invention

The present invention is related to a repairable touch control device and a method for repairing a touch control panel, and more particularly, to a touch control display panel with a repairing wiring located in the peripheral region for repairing a sensor wiring in the display region.

2. Description of the Prior Art

In consumer electronic products nowadays, it is widely seen that touch control panels are utilized as a human-machine communicating media in portable electronic device such as flat panel computer, personal digital assistant (PDA), mobile phones, global positioning system (GPS), and video player.

FIG. 1 is a schematic diagram of a conventional touch control display panel. As shown in FIG. 1, the conventional touch control display panel includes a display panel 10 and a touch control device 20 attached to the display panel 10. The display panel 10, e.g. a liquid crystal display (LCD) panel, includes a thin film transistor (TFT) substrate 12, a color filter (CF) substrate 14 disposed opposite to the TFT substrate 12, a liquid crystal layer 16 interposed between the TFT substrate 12 and the CF substrate 14, and a polarizing film 18 disposed on the surface of the CF substrate 14 opposite to the TFT substrate 12. The touch control device 20 is simply a device for touch control, including a transparent substrate 22, a sensor circuit 24 disposed on the transparent substrate 22, and a protection layer 26 disposed on the transparent substrate 22 while further covering the sensor circuit 24. As shown in FIG. 1, since the touch control device 20 and the display panel 10 are two independent structures assembled together by attaching after fabricated individually, the volume and thickness of the conventional touch control display panel is too large, which is not able to fulfill the requirements for compactness of consumer electronic products nowadays.

SUMMARY OF THE INVENTION

One object of the present invention is to provide a repairable touch control display panel and a repairing method thereof to increase integration and yield of touch control display panel.

To achieve the above-mentioned object, a repairable touch control device is provided according to the present invention. The repairable touch control device includes a substrate, a sensor circuit, and at least a repairing wiring. The substrate includes a sensor region, and a peripheral region. The sensor circuit, which includes sensor wirings, is disposed in the sensor region. The repairing wiring is disposed in the peripheral region for repairing the sensor wirings.

To achieve the above-mentioned object, a repairable touch control display panel is provided according to the present invention. The repairable touch control display panel includes a display panel, a sensor circuit, and at least a repairing wiring. The display panel includes a sensor region and a peripheral region. The sensor circuit, which includes sensor wirings, is disposed in the sensor region. The repairing wiring is disposed in the peripheral region for repairing the sensor wirings.

To achieve the above-mentioned object, a method of repairing a touch control panel is provided according to the present invention. The method includes the following steps. First, a touch control panel is provided. The touch control panel includes a substrate, a sensor circuit, and at least a repairing wiring. The substrate includes a sensor region, and a peripheral region. The sensor circuit, which includes sensor wirings, is disposed in the sensor region. The repairing wiring is disposed in the peripheral region for repairing the sensor wirings. Subsequently, a detection process is performed on the sensor circuit to detect a sensor wiring required to be repaired. Later, a repairing process is performed on the sensor circuit to electrically connect the repairing wiring to the sensor wiring required to be repaired.

The repairable touch control display panel and the repairing method thereof according to the present invention uses the repairing wiring to repair the damaged sensor wiring. Therefore, the yield of touch control display panel is increased and the cost is tremendously reduced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be made in details. The preferred embodiments of the present invention are illustrated in the accompanying drawings with numbered elements.

Figure 1:
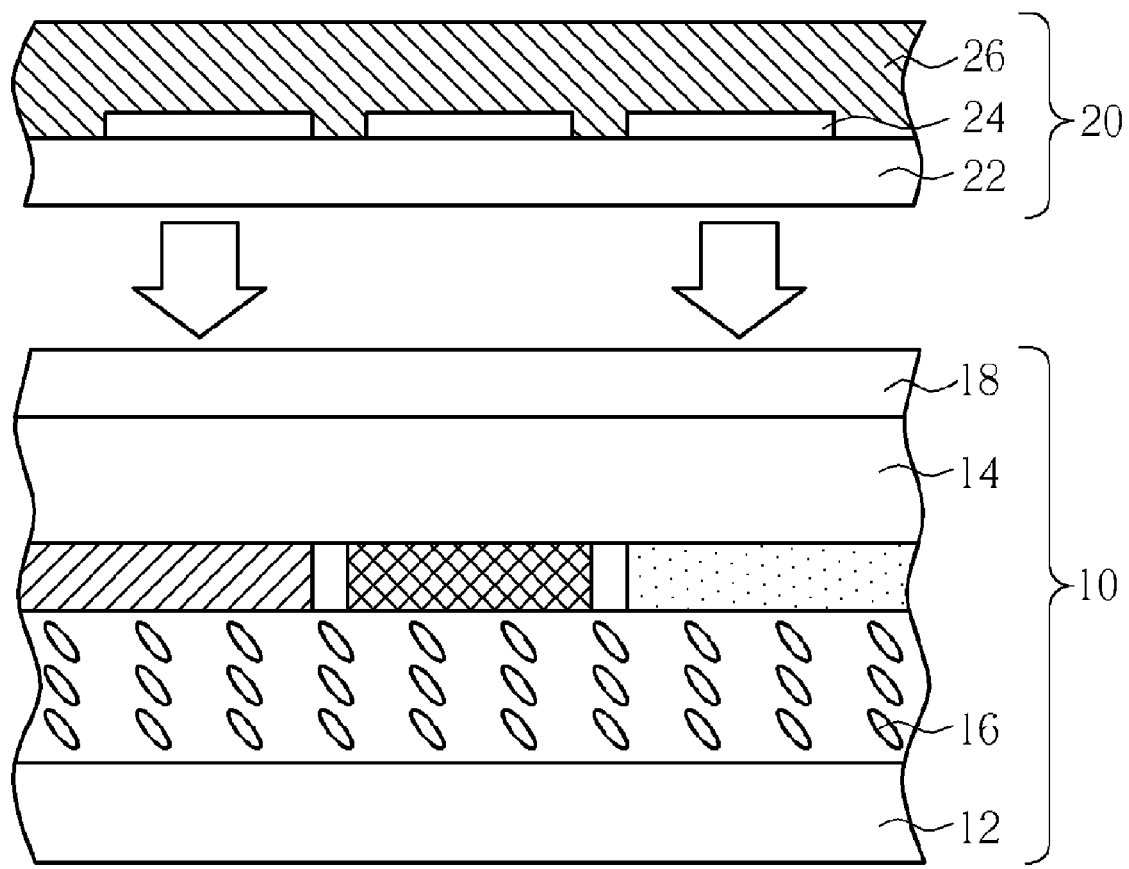
FIG. 1 is a schematic diagram of a conventional touch control display panel.
Figure 2:
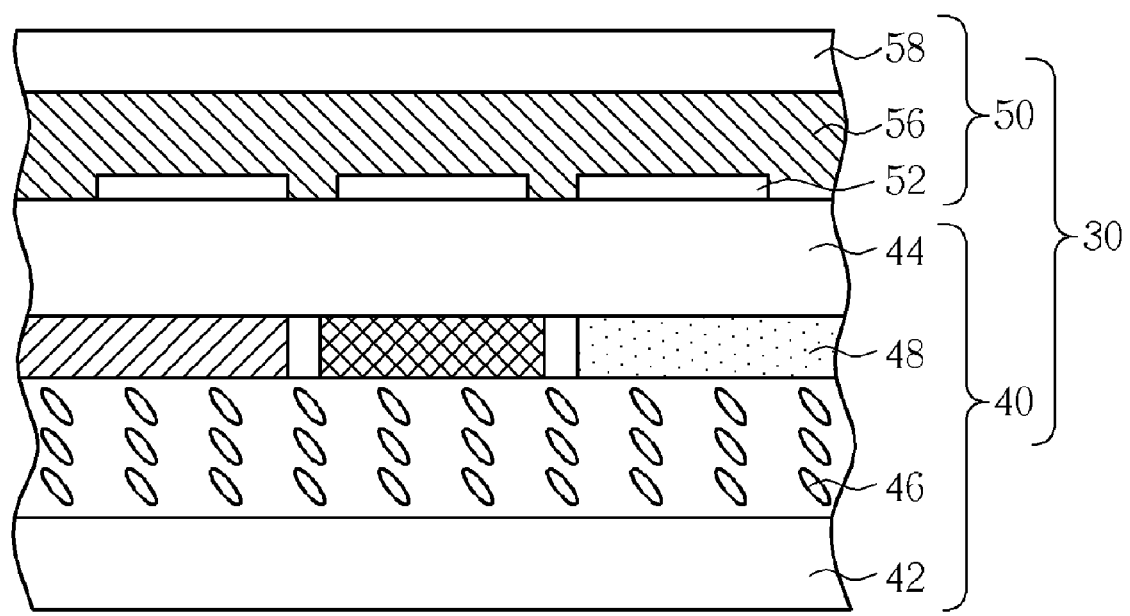
FIG. 2 and FIG. 3 are schematic diagrams of a repairable touch control display panel according to a preferred embodiment of the present invention under a normal condition.
Figure 3:
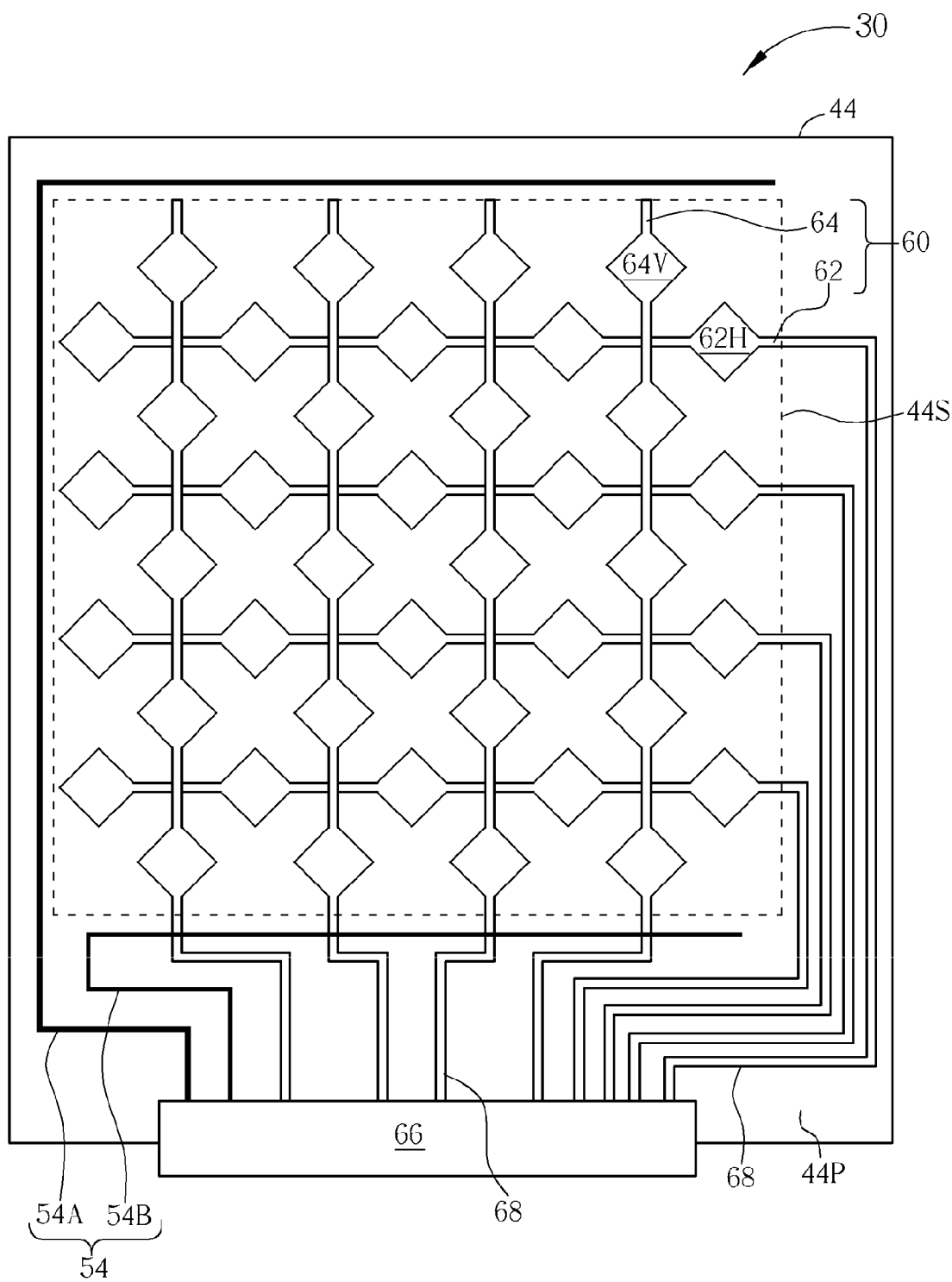

FIG. 2 and FIG. 3 are schematic diagrams of a repairable touch control display panel according to a preferred embodiment of the present invention under normal condition. As shown in FIG. 2 and FIG. 3, the repairable touch control display panel 30 of the present invention includes a display panel 40, and a repairable touch control device 50 which can be disposed on the surface of the display panel 40 or else can be disposed on the surface of other devices. In the present embodiment, the display panel 40 includes a liquid crystal display panel, but is not limited to the liquid crystal display panel and may be other display device, for instance an electronic paper, a plasma display panel (PDP) or an electroluminescent display (ELD). The display panel 40 includes a first substrate and a second substrate, for instance, a thin film transistor (TFT) substrate 42 and a color filter (CF) substrate 44, respectively. The CF substrate 44 is disposed opposite to the TFT substrate 42, and a liquid crystal layer 46 is interposed between the CF substrate 44 and the TFT substrate 42. A plurality of color filters 48 are disposed on the surface of the CF substrate 44 that faces the TFT substrate 42, and a sensor region 44S and a peripheral region 44P are located on the other surface of the CF substrate 44 opposite to the TFT substrate 42.

The repairable touch control device 50 is disposed on the surface of the CF substrate 44 that is opposite to the TFT substrate 42, and thus the CF substrate 44 can also serve as a substrate of the repairable touch control device 50. The repairable touch control device 50 includes a sensor circuit 52 disposed in the sensor region 44S, at least a repairing wiring 54 which is utilized to repair the sensor circuit 52 and disposed in the peripheral region 44P, a protection layer 56 disposed above both the sensor circuit 52 and the repairing wiring 54, and a polarizing film 58 disposed on the protection layer 56. It is to be noted that not all parts of the sensor circuit 52 and the repairing wiring 54 are being covered by the protection layer 56, thus part of the sensor circuit 52 and part of the repairing wiring 54 are exposed. In addition, the polarizing film 58 would be attached to the protection layer 56 after no defect is detected in the repairable touch control device 50 or after the repairing process is completed.

The sensor circuit 52 and the repairing wiring 54 may be formed by metal conductive materials or transparent conductive materials. The sensor circuit 52 and the repairing wiring 54 may be formed by materials of the same layer or materials of different layers. The sensor circuit 52 includes a plurality of sensor wirings 60. The sensor wirings 60 include a plurality of horizontal sensor wirings 62 and a plurality of vertical sensor wirings 64. Each of the horizontal sensor wirings 62 has a plurality of horizontal sensor pads 62H connected in series, and each of the vertical sensor wirings 64 has a plurality of vertical sensor pads 64V connected in series. The repairable touch control device 50 further includes a control circuit 66, and a plurality of conductive wires 68 electrically connect the sensor wirings 60 to the control circuit 66. Therefore, the control circuit 66 may receive the input signal that is detected by the sensor wirings 60.

The repairing wiring 54 is disposed in the peripheral region 44P and electrically connected to the control circuit 66. Under normal conditions, the repairing wiring 54 is not electrically connected to the sensor wirings 60. The function of the repairing wiring 54 is to create a proper electrical connection to a damaged sensor wiring 60 when broken circuit occurs due to particles or other reasons, such that the input signal sensed by the sensor wiring 60 can be successfully delivered to the control circuit 66. In the present embodiment, the repairing wiring 54 includes a first repairing wiring 54A and a second repairing wiring 54B. The first repairing wiring 54A surrounds an end point disposed on one side of each horizontal sensor wiring 62 and an end point disposed on one side of each vertical sensor wiring 64. The second repairing wiring 54B surrounds an end point disposed on the other side of each horizontal sensor wiring 62 and an end point disposed on the other side of each vertical sensor wiring 64.

Figure 4:
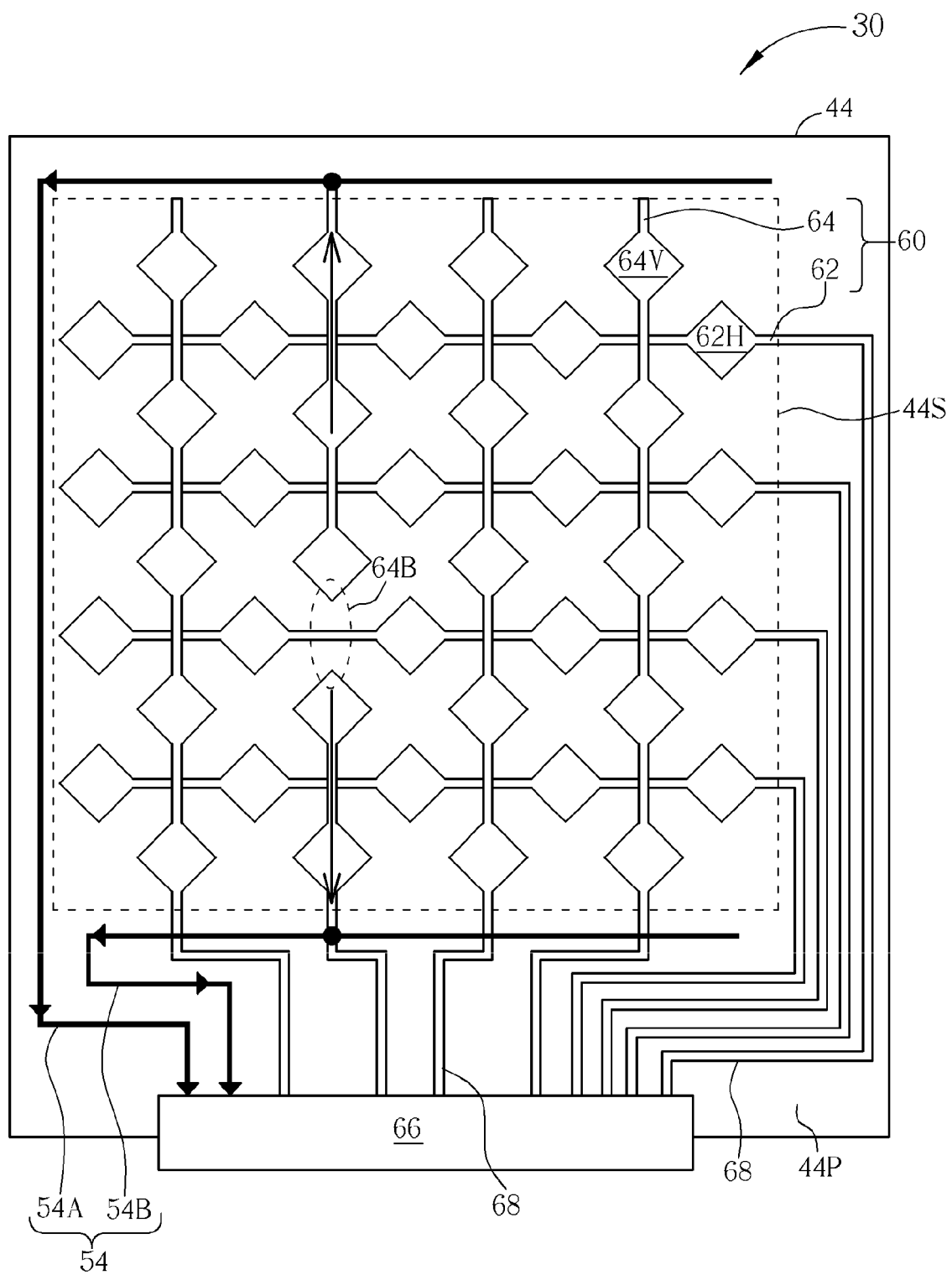
FIG. 4 is a schematic diagram of a repairable touch control display panel of FIG. 3 under a repairing condition.

FIG. 4 is a schematic diagram of the repairable touch control display panel of FIG. 3 under repairing condition. When a defect occurs to the sensor wiring 60, such as a broken circuit 64B due to a particle shown in FIG. 4, a detected signal cannot be delivered to the control circuit 66 via the vertical sensor wiring 64. Under this situation, the repairing wiring 54 may be utilized to perform a repair process. As shown in FIG. 4, when the broken circuit 64B occurs to the vertical sensor wiring 64, an end point of the vertical sensor wiring 64 is electrically connected to the first repairing wiring 54A, while the other end point of the vertical sensor wiring 64 is electrically connected to the second repairing wiring 54B. Hence, the signal detected by the vertical sensor pad 64V on a side of the broken circuit 64B may be able to transmit to the control circuit 66 via the first repairing wiring 54A. Moreover, the signal detected by the vertical sensor pad 64V on the other side of the broken circuit 64B may be able to transmit to the control circuit 66 via the second repairing wiring 54B. In addition, the first repairing wiring 54A and the second repairing wiring 54B are electrically connected to each other within the control circuit 66, so that input signals can be correctly received by the control circuit 66.

Figure 5:
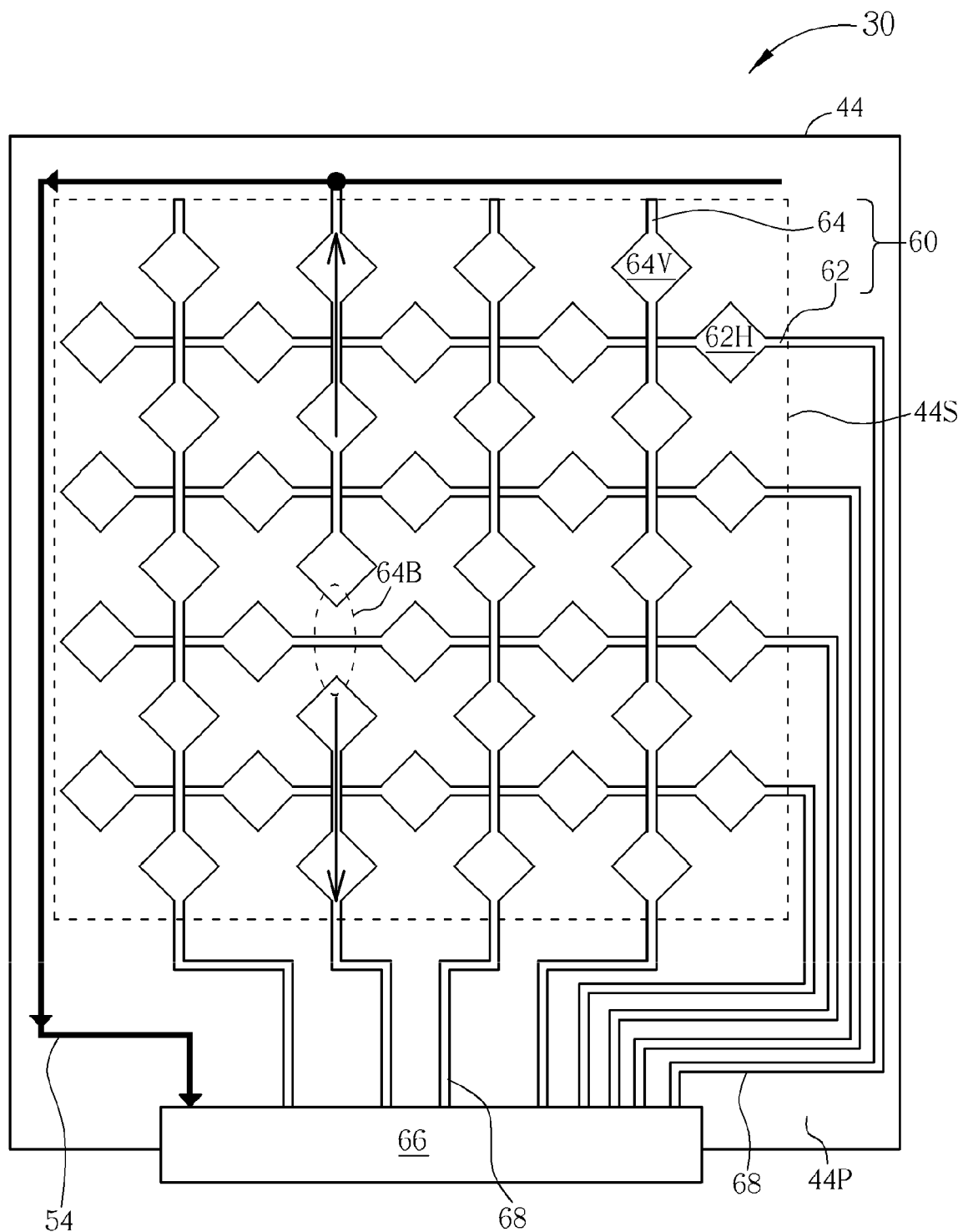
FIG. 5 is a schematic diagram of a repairable touch control display panel according to another preferred embodiment of the present invention.

FIG. 5 is a schematic diagram of a repairable touch control display panel according to another preferred embodiment of the present invention. As shown in FIG. 5, there is only one repairing wiring 54 in the present embodiment. The repairing wiring 54 surrounds an end point on a side of each horizontal sensor wiring 62 and an end point on a side of each vertical sensor wiring 64. When a broken circuit 64B occurs to the vertical sensor wiring 64, the vertical sensor wiring 64 may not be able to deliver the detected signal to the control circuit 66. Under this situation, the repairing wiring 54 may be utilized to perform repair process. An end point of the vertical sensor wiring 64 is electrically connected to the repairing wiring 54, thus the signal detected by the vertical sensor pad 64V on a side of the broken circuit 64B may be able to deliver to the control circuit 66 via the repairing wiring 54. The signal detected by the vertical sensor pad 64V on the other side of the broken circuit 64B may still be able to deliver to the control circuit 66 via the conductive wire 68 originally electrically connected to the vertical sensor wiring 64 and the control circuit 66. In this embodiment, the repairing wiring 54 is electrically connected to the vertical sensor wiring 64 having the broken circuit 64B, such that the control circuit 66 can receive the input signal precisely.

Figure 6:
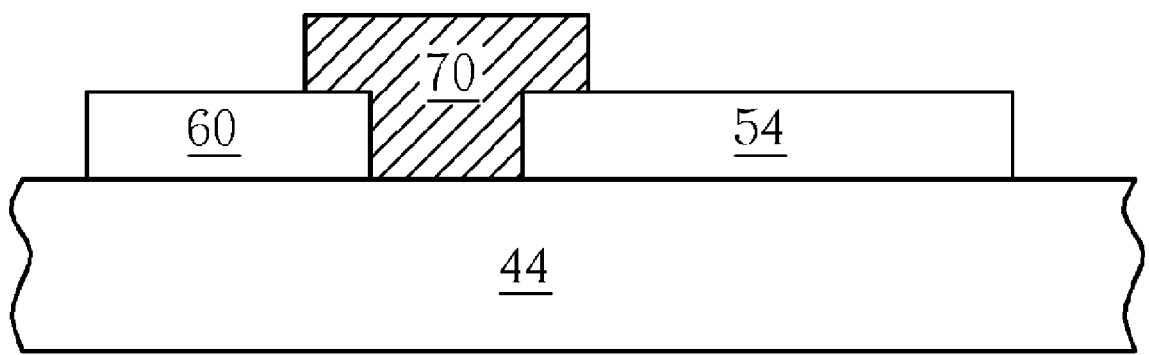
FIG. 6 and FIG. 7 are schematic diagrams of a repairing wiring and a sensor wiring according to a preferred embodiment of the present invention.
Figure 7:
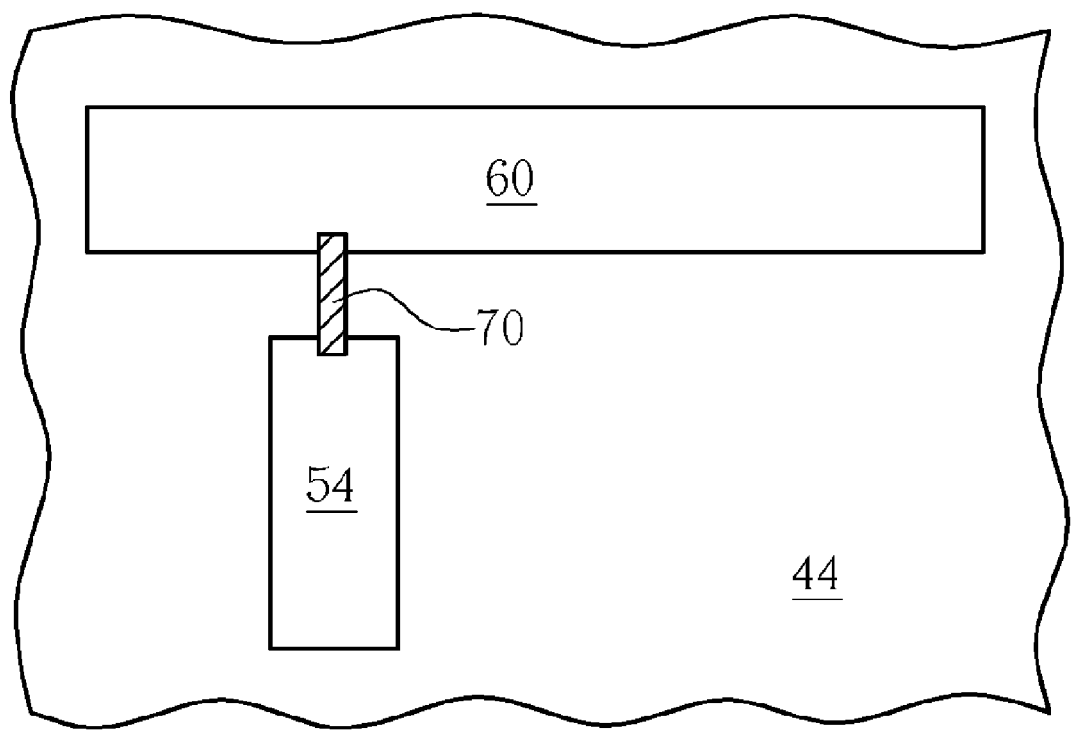

The following paragraph will further illustrate the relative location and connection between the repairing wiring 54 and the sensor wiring 60. FIG. 6 and FIG. 7 are schematic diagrams of a repairing wiring and a sensor wiring according to a preferred embodiment of the present invention. FIG. 6 is a schematic cross-sectional view of a repairing wiring and a sensor wiring according to this embodiment. FIG. 7 is a plane view diagram of the repairing wiring and the sensor wiring. As shown in FIG. 6 and FIG. 7, the sensor wiring 60 and the repairing wiring 54 are located in the same plane in the present embodiment. The sensor wiring 60 is not electrically connected to the repairing wiring 54 under normal condition, and the sensor wiring 60 and the repairing wiring 54 are partially exposed and not completely covered by a protection layer or other film layers when no defects were detected or before performing a repairing process. When defects occur to the sensor wiring 60 and requires to be repaired, a conductive material 70 such as Ag paste or other conductive materials may be utilized. In addition, the conductive material 70 may be formed by a deposition process such as a laser chemical vapor deposition (Laser CVD) process so as to electrically connect the repairing wiring 54 to the sensor wiring 60 that requires to be mended.

Figure 8:
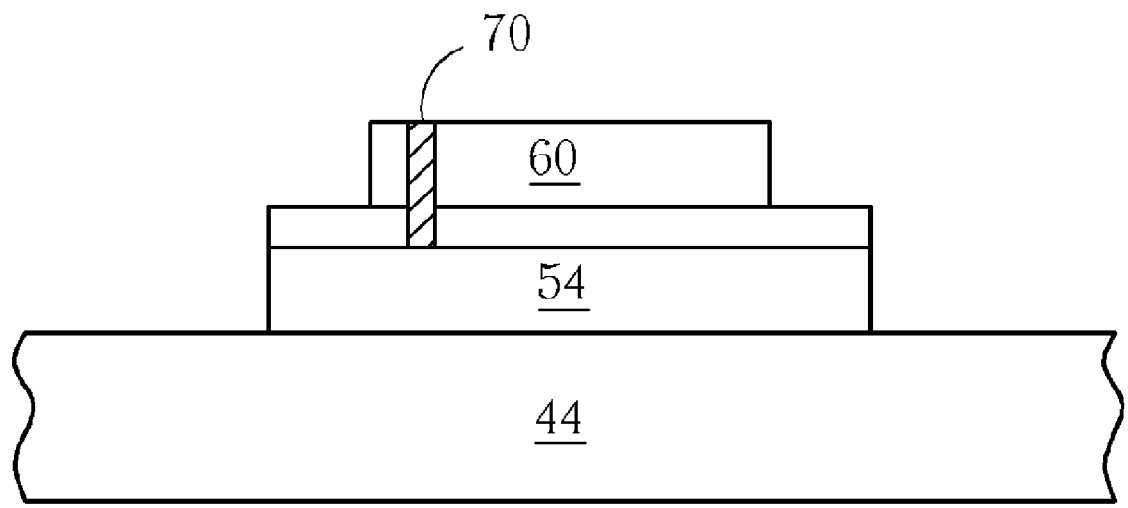
FIG. 8 and FIG. 9 are schematic diagrams of a repairing wiring and a sensor wiring according to another preferred embodiment of the present invention.
Figure 9:
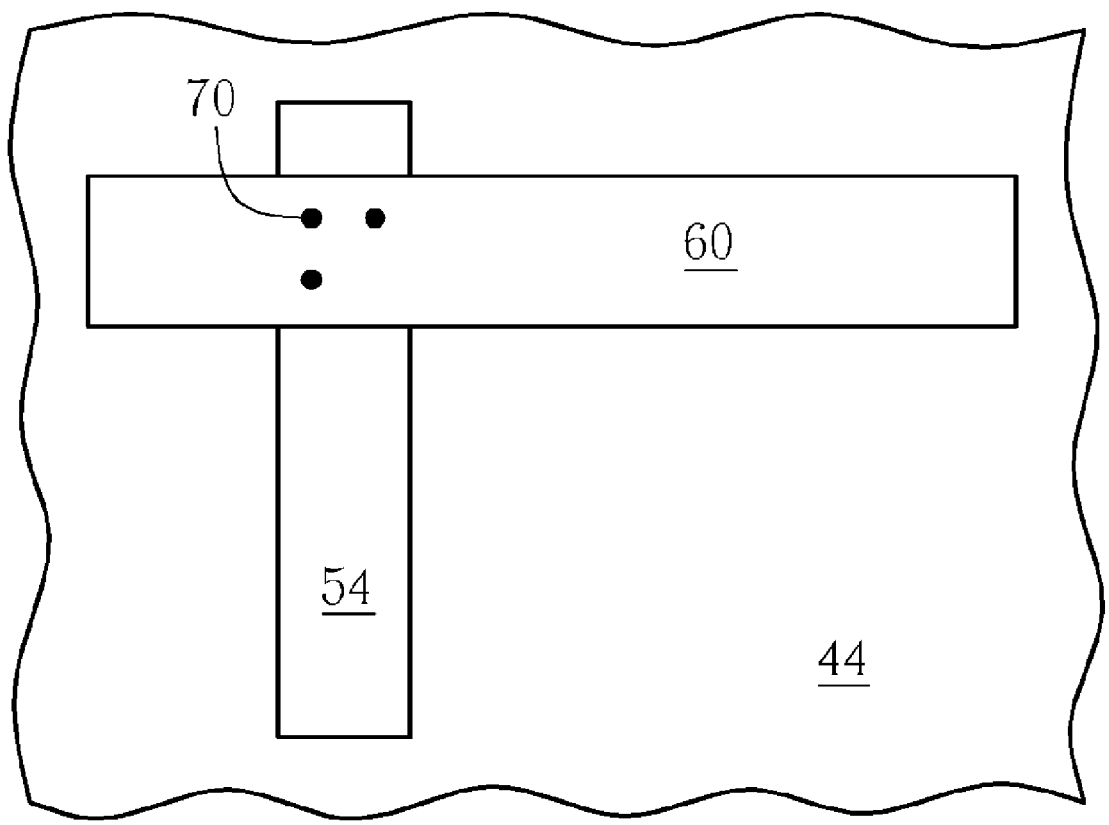

FIG. 8 and FIG. 9 are schematic diagrams of a repairing wiring and a sensor wiring according to another embodiment of the present invention. FIG. 8 is a schematic cross-sectional view of the repairing wiring and the sensor wiring according to another embodiment. FIG. 9 is a plane view of the repairing wiring and the sensor wiring. As shown in FIG. 8 and FIG. 9, in the present embodiment, the sensor wiring 60 is located above the repairing wiring 54 and not electrically connected to the repairing wiring 54 under normal condition. When defect occurs to the sensor wiring 60 and requires repairing, a welding process such as a laser welding process may be utilized to electrically connect the repairing wiring 54 to the sensor wiring 60. However, under the situation that the sensor wiring 60 is located above the repairing wiring 54, the same method as mentioned in the previous embodiment may be utilized. In other words, the conductive material 70 may be configured to electrically connect the repairing wiring 54 to the sensor wiring 60.

Figure 10:
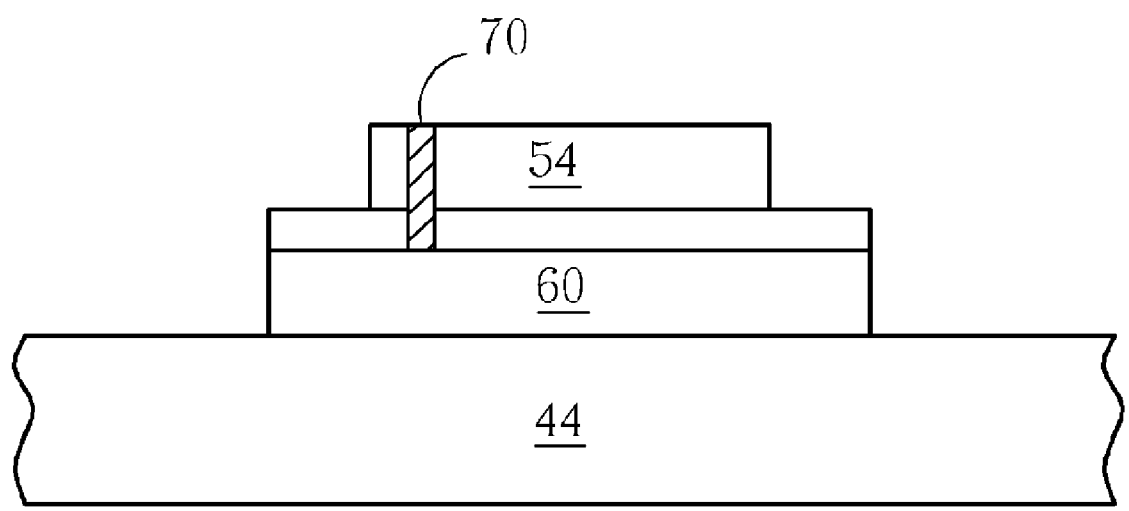
FIG. 10 and FIG. 11 are schematic diagrams of a repairing wiring and a sensor wiring according to still another preferred embodiment of the present invention.
Figure 11:
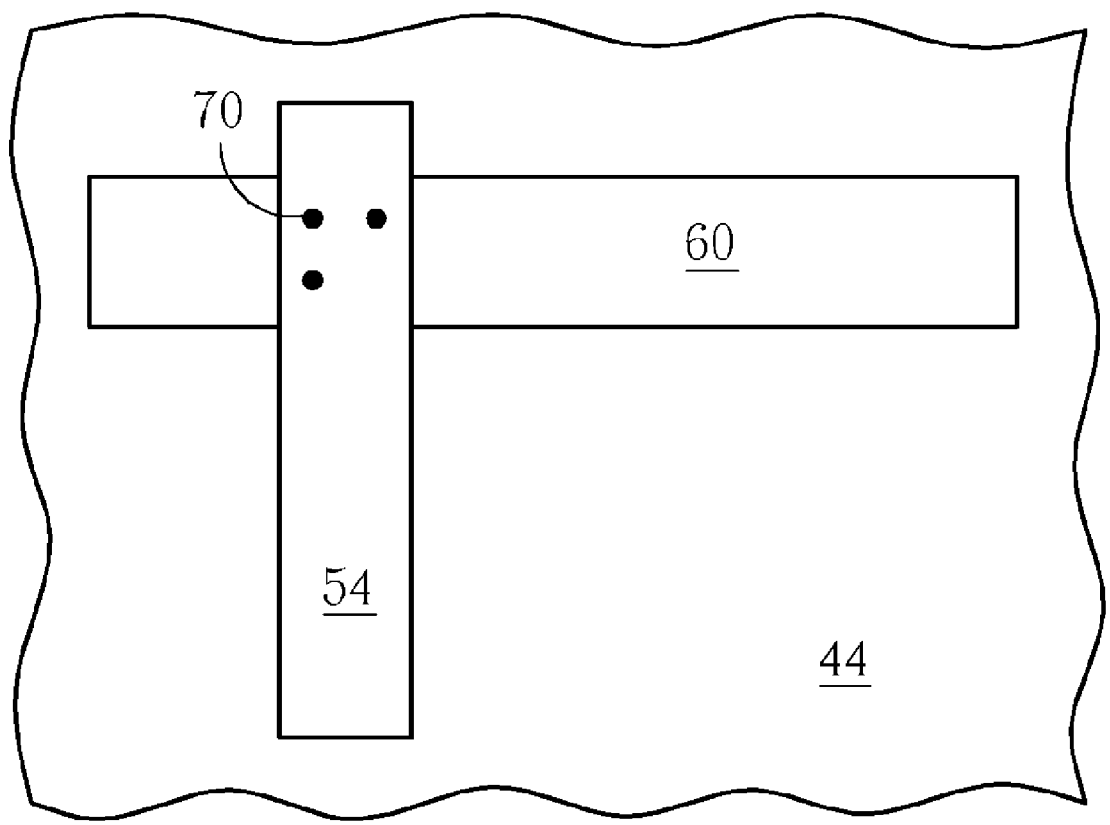

FIG. 10 and FIG. 11 are schematic diagrams of a repairing wiring and a sensor wiring according to another embodiment of the present invention. FIG. 10 is a cross-sectional view of the repairing wiring and the sensor wiring according to still another embodiment. FIG. 11 is a plane view of the repairing wiring and the sensor wiring. As shown in FIG. 10 and FIG. 11, unlike the previous embodiment, the repairing wiring 54 is located above the sensor wiring 60, and not electrically connected to the repairing wiring 54 under normal condition. However, when defect occurs to the sensor wiring 60 and required to be repaired, a welding process such as a laser welding process or a conductive material 70 may be configured to electrically connect the repairing wiring 54 to the sensor wiring 60.

Figure 12:
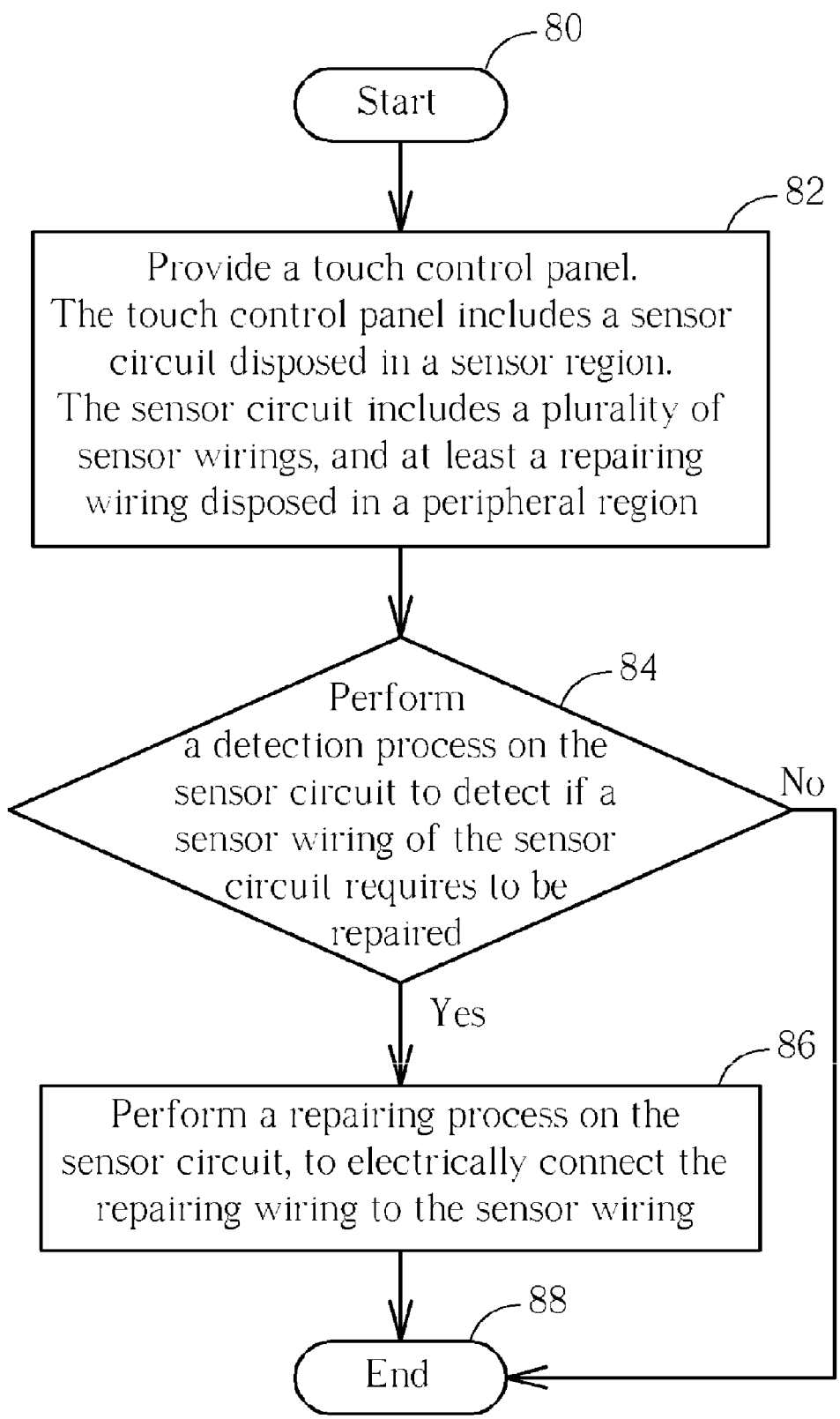
FIG. 12 is a flow chart showing a method for repairing the touch control panel according to the present invention.

Please refer to FIG. 12, as well as FIG. 2 to FIG. 11. FIG. 12 is a flow chart showing a method for repairing the touch control panel according to the present invention. As shown in FIG. 12, the method of the present invention includes the following steps:

Step 80: Start;

Step 82: Provide a touch control panel. The touch control panel includes a sensor circuit disposed in a sensor region. The sensor circuit includes a plurality of sensor wirings, and at least a repairing wiring disposed in a peripheral region;

Step 84: Perform a detection process on the sensor circuit to detect if a sensor wiring of the sensor circuit requires to be repaired, if so, execute Step 86, and if not, execute Step 88;

Step 86: Perform a repairing process on the sensor circuit to electrically connect the repairing wiring to the sensor wiring; and Step 88: End.

Although in the above mentioned embodiments, the broken circuit of the vertical sensor wiring of the sensor wiring is illustrated as an example of the present invention. It is in fact that the application of the present invention is not limited to the examples, it may be applied to mend the horizontal sensor wiring of the sensor wiring. In addition, the defect is not limited to a broken circuit, while it may be a short circuit. For instance, when a short circuit happens while detecting the vertical sensor wiring and the horizontal sensor wiring, the short circuited part may be broken into two disconnected parts in advance, and the aforementioned repairing process may be subsequently performed. Moreover, the number of the repairing wiring is not limited to one, and may be adjusted according to the spatial arrangement of the peripheral region, the possibility of defect occurrence and the cost of repairing process.

The touch control device of the present invention is integrated into the surface of the display panel. Therefore, the substrate of the display panel must undergo double side process, so as to fabricate the elements of the touch control device and the display panel (such as color filter and common electrode and so forth). However, when fabricating the elements of the display panel, the touch control device, which has been formed already, must be in contact with the supporting carrier of the apparatus, thus increasing the possibility of defect occurrence. Under this condition, the repairable touch control display panel and the repairing method thereof in the present invention may repair the damaged sensor wiring. Henceforth, the damaged touch control device may be repaired without being discarded.

Those skilled in the art will readily observe that numerous modifications and alterations of the device and method may be made while retaining the teachings of the invention.

What is claimed is:

1. A repairable touch control device, comprising:
   a substrate comprising a sensor region and a peripheral region;
   a control circuit, at least partially disposed on the peripheral region of the substrate;
   a sensor circuit disposed on the sensor region of the substrate, the sensor circuit comprising a plurality of sensor wirings electrically connected to the control circuit; and
   a first repairing wiring disposed on the peripheral region of the substrate and electrically connected to the control circuit, wherein the first repairing wiring for repairing the sensor wirings is disposed adjacent to and substantially not overlapped with the sensor wirings.

2. The repairable touch control device of claim 1, wherein the sensor wirings and the first repairing wiring are located in the same layer.

3. The repairable touch control device of claim 1, further comprising a second repairing wiring, wherein the sensor wirings are disposed on the second repairing wiring or the second repairing wiring is disposed on the sensor wirings.

4. The repairable touch control device of claim 1, wherein the sensor wirings comprise a plurality of horizontal sensor wirings and a plurality of vertical sensor wirings, wherein each of the horizontal sensor wirings comprises a plurality of horizontal sensor pads connected in series, and each of the vertical sensor wirings comprises a plurality of vertical sensor pads connected in series.

5. The repairable touch control device of claim 1, further comprising a plurality of conductive wires configured to electrically connect the sensor wirings to the control circuit.

6. A repairable touch control display panel, comprising:
   a display panel comprising a sensor region and a peripheral region on a surface of the display panel;
   a control circuit, at least partially disposed on the peripheral region of the display panel;
   a sensor circuit disposed on the sensor region of the display panel, the sensor circuit comprising a plurality of sensor wirings electrically connected to the control circuit; and
   a first repairing wiring disposed on the peripheral region of the display panel and electrically connected to the control circuit, wherein the first repairing wiring for repairing the sensor wirings is disposed adjacent to and substantially not overlapped with the sensor wirings.

7. The repairable touch control display panel of claim 6, wherein the display panel comprises a liquid display panel.

8. The repairable touch control display panel of claim 7, wherein the liquid display panel comprises:
   a thin film transistor (TFT) substrate;
   a color filter (CF) substrate disposed opposite to the TFT substrate, wherein the sensor region and the peripheral region are disposed on a surface of the CF substrate opposite to the TFT substrate; and
   a liquid crystal layer interposed between the TFT substrate and the CF substrate.

9. The repairable touch control display panel of claim 6, wherein the sensor wirings and the first repairing wiring are located in the same layer.

10. The repairable touch control display panel of claim 6, further comprising a second repairing wiring, wherein the sensor wirings are disposed on the second repairing wiring.

11. The repairable touch control display panel of claim 10, wherein the second repairing wiring is disposed on the sensor wirings.

12. The repairable touch control display panel of claim 6, wherein the sensor wirings comprise a plurality of horizontal sensor wirings and a plurality of vertical sensor wirings, wherein each of the horizontal sensor wirings comprises a plurality of horizontal sensor pads connected in series, and each of the vertical sensor wirings comprises a plurality of vertical sensor pads connected in series.

13. The repairable touch control display panel of claim 6, further comprising a plurality of conductive wires configured to electrically connect the sensor wirings to the control circuit.

14. A method of repairing a touch control panel, comprising:
   providing a touch control panel, comprising:
      a substrate, comprising a sensor region and a peripheral region;
      a control circuit, at least partially disposed on the peripheral region of the substrate;
      a sensor circuit disposed on the sensor region of the substrate, the sensor circuit comprising a plurality of sensor wirings electrically connected to the control circuit; and
      a first repairing wiring disposed in the peripheral region of the substrate and electrically connected to the control circuit, wherein the first repairing wiring for repairing the sensor wirings is disposed adjacent to and substantially not overlapped with the sensor wirings ; and
   performing a detection process on the sensor circuit to detect a sensor wiring required to be repaired; and
   performing a repairing process on the sensor circuit to electrically connect the first repairing wiring to the sensor wiring required to be repaired.

15. The method of claim 14, wherein the repairing process comprises utilizing a conductive material to electrically connect the first repairing wiring to the sensor wiring required to be repaired.

16. The method of claim 14, further comprising a welding process to electrically connect a second repairing wiring to the sensor wiring required to be repaired, wherein the second repairing wiring is overlapped with the sensor wiring required to be repaired.

17. The method of claim 16, wherein the welding process comprises a laser welding process.

18. The method of claim 14, wherein the repairing process comprises utilizing a laser chemical vapor deposition process to electrically connect the first repairing wiring to the sensor wiring required to be repaired.

19. The method of claim 14, wherein the sensor wiring required to be repaired is electrically connected to the control circuit via the first repairing wiring by the repairing process.

* * * * *